Oct. 4, 1927.
A. I. MARCUM
1,644,023
DRIVE MECHANISM FOR MULTIWHEELER
Filed July 22, 1926
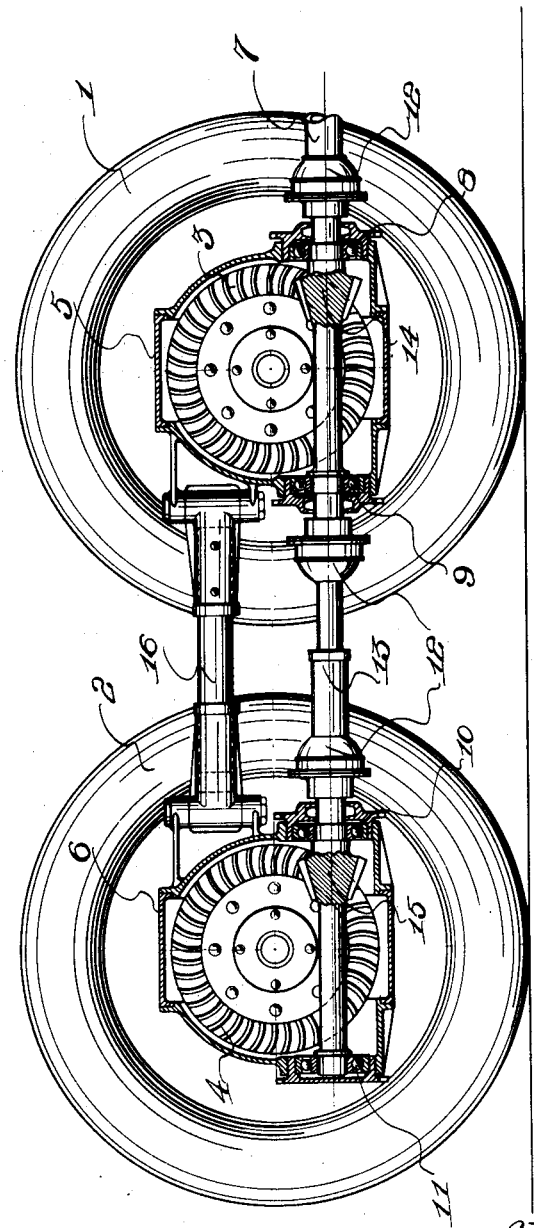
Inventor
Arthur I. Marcum
William A. Strauch
By
Attorney Patented Oct. 4, 1927.

1,644,023

UNITED STATES PATENT OFFICE.

ARTHUR I. MARCUM, OF OAKLAND, CALIFORNIA, ASSIGNOR TO EMORY WINSHIP, OF MACON, GEORGIA.

DRIVE MECHANISM FOR MULTIWHEELERS.

Application filed July 22, 1926. Serial No. 124,158.

This invention relates to a drive mechanism for multi-wheel vehicles.

The primary object of the invention is to provide a construction in which the propeller shaft is arranged between the upper and lower edges of the axle housings, to provide a maximum road and body clearance.

A further object of the invention is to provide a construction in which the propeller shaft is located beneath the horizontal plane that contains the axes of the axles.

A still further object of the invention is to provide a drive mechanism for a motor vehicle of extreme simplicity that embodies Hypoid gears.

A still further object of the invention is to provide a construction in which the driving shaft is readily accessible.

Further objects of the invention will appear as the description proceeds with reference to the drawing in which the single figure is a longitudinal sectional view through the driven axles of a six or eight wheel vehicle.

In the figure, 1 and 2 are wheels of the tandem arranged driven axles of a multi-wheeled vehicle, 3 and 4 the master gears on the differential housings that serve to differentially drive the several wheels on each axle, this construction being that usually employed for the stated purpose. As shown the master gears 3 and 4 are encased by the usual axle housings 5 and 6.

The propeller shaft 7 of the motor is carried directly through the housings 5 and 6 being journaled in bearings 8 and 9, 10 and 11, arranged in said housings. As is customary said shaft includes universal joints 12 and a slip joint 13 to allow the necessary relative movement between the axles as the wheels pass over road irregularities. As shown on the drawings said shaft is preferably arranged below the horizontal plane that contains the axes of the axles, but above the lower limits of the housings.

Shaft 7 has fixed thereto gears 14 and 15 that mesh with master gears 3 and 4. These gears are of the Hypoid type such as described in the June 1926 number of the Journal of the Society of Automotive Engineers.

A torque tube 16 of the construction described in copending application Serial No. 743,201, serves to connect the axle housings and to resist the torque reactions. As shown in the drawings, the torque tube is preferably arranged above the drive shaft and the axis thereof is preferably in the same vertical plane as the axis of the drive shaft under normal conditions.

By the arrangement above described the drive shaft is brought wholly within the limits of the housings of the axles permitting the floors of the vehicle to be lowered without reducing the road clearance. In addition, the drive shaft is brought below the plane that contains the axes of the axles, where it is readily accessible for repair or removal. These results are accomplished in a construction of extreme simplicity.

What I claim is:

1. In combination with a pair of tandem drive axles supporting load carrying housings, each axle including a master driving gear, of a continuous flexible drive shaft extending in a substantially straight line through said housings under normal conditions between horizontal planes tangent to said master gears and journaled in the housings at a plurality of points spaced along said shaft, and gears meshing with said master gears secured to said shaft.

2. The combination defined in the claim immediately preceding in which the continuous flexible drive shaft is arranged between a horizontal plane containing the axle axis and the horizontal plane that is tangent to a master gear at its lowest point.

3. In combination with a pair of tandem drive axles supporting load carrying housings, each axle including a master driving gear, of a continuous flexible drive shaft extending through and journaled in the sides of said housings between the horizontal planes tangent to said master gears, gears on said shaft meshing with said master gears, and a torque resisting connection extending between said housings and located substantially between said planes.

4. The combination defined in the claim immediately preceding in which the axis of drive shaft is positioned beneath the horizontal plane containing the axes of the axles and the torque resisting connection is positioned above said plane.

5. A road vehicle including tandem axles supporting one end thereof, load supporting housings on said axles, a master driving gear secured to each axle, a flexible drive shaft extending continuously through said housings and carrying gears meshing with said master gears between two horizontal planes one of which is tangent to the master gears and the other of which includes the axes of the axles, and bearings in said housings arranged at opposite sides of each of said last named gears.

In testimony whereof I affix my signature.

ARTHUR I. MARCUM.